United States Patent
Nidasio

(10) Patent No.: US 12,518,120 B2
(45) Date of Patent: Jan. 6, 2026

(54) METHOD FOR MANUFACTURING A PRODUCT MAINLY MADE OF PAPER INCLUDING, THEREIN, AT LEAST ONE RADIO-FREQUENCY ELECTROMAGNETIC WAVE TRANSCEIVER

(71) Applicant: ARTI GRAFICHE NIDASIO DIGITAL S.R.L., Milan (IT)

(72) Inventor: Giorgio Nidasio, Milan (IT)

(73) Assignee: ARTI GRAFICHE NIDASIO DIGITAL S.R.L., Milan (IT)

( * ) Notice: Subject to any disclaimer, the term of this patent is extended or adjusted under 35 U.S.C. 154(b) by 274 days.

(21) Appl. No.: 18/554,557

(22) PCT Filed: Jul. 30, 2021

(86) PCT No.: PCT/IT2021/050238
§ 371 (c)(1),
(2) Date: Oct. 9, 2023

(87) PCT Pub. No.: WO2022/229990
PCT Pub. Date: Nov. 3, 2022

(65) Prior Publication Data
US 2024/0193393 A1    Jun. 13, 2024

(30) Foreign Application Priority Data
Apr. 30, 2021  (IT) .................. 102021000010964

(51) Int. Cl.
| | |
|---|---|
| *B32B 7/12* | (2006.01) |
| *B32B 29/00* | (2006.01) |
| *B32B 37/12* | (2006.01) |
| *G06K 19/02* | (2006.01) |
| *G06K 19/07* | (2006.01) |

(52) U.S. Cl.
CPC .............. *G06K 19/025* (2013.01); *B32B 7/12* (2013.01); *B32B 29/005* (2013.01); *B32B 37/1207* (2013.01); *B32B 37/1284* (2013.01); *G06K 19/0723* (2013.01); *B32B 2250/02* (2013.01); *B32B 2250/05* (2013.01); *B32B 2255/12* (2013.01); *B32B 2307/212* (2013.01); *B32B 2317/00* (2013.01)

(58) Field of Classification Search
CPC .......... B32B 2317/00; B32B 2307/212; B32B 2255/12; B32B 2250/05; B32B 2250/02; B32B 37/1284; B32B 37/1207; B32B 29/005; B32B 7/12; G06K 19/0723; G06K 19/025
See application file for complete search history.

(56) References Cited

U.S. PATENT DOCUMENTS

2014/0322500 A1 * 10/2014 Depres ..................... B41M 1/22
                                                        156/247

FOREIGN PATENT DOCUMENTS

| EP | 3269558 A1 * | 1/2018 | ............. B42D 25/46 |
| EP | 3705306 A1 * | 9/2020 | ............ B42D 25/305 |
| KR | 20090017606 A | 2/2009 | |
| WO | WO-2020234209 A1 * | 11/2020 | ......... G06Q 10/0875 |

OTHER PUBLICATIONS

International Search Report and Written Opinion of the ISA for PCT/IT2021/050238 mailed Jan. 25, 2022, 11 pages.

* cited by examiner

*Primary Examiner* — Vishal I Patel
(74) *Attorney, Agent, or Firm* — NIXON & VANDERHYE

(57) ABSTRACT

Disclosed is a method for manufacturing a product mainly made of paper including at least one radio-frequency electromagnetic wave transceiver adapted both to receive at least a first predefined signal and to emit, upon receiving the first signal, at least a second signal, also predefined. To implement the method, it is first necessary to prepare at least two sheets, mainly made of paper, such as two sheets of paper. Glue is applied to one of the sheets, the transceiver, such as an RFID tag or an NFC tag, is applied to the other sheet. The two sheets are then coupled, calendered and subjected to a finishing cut. The transceiver is programmable in any step of the method.

20 Claims, No Drawings

METHOD FOR MANUFACTURING A PRODUCT MAINLY MADE OF PAPER INCLUDING, THEREIN, AT LEAST ONE RADIO-FREQUENCY ELECTROMAGNETIC WAVE TRANSCEIVER

CROSS-REFERENCE TO RELATED APPLICATIONS

This application is the U.S. national phase of International Application No. PCT/IT2021/050238 filed Jul. 30, 2021, which designated the U.S. and claims priority to IT 102021000010964 filed Apr. 30, 2021, the entire contents of each of which are hereby incorporated by reference.

FIELD OF APPLICATION OF THE INVENTION

The present invention finds application in the paper industry.

More precisely, the present invention relates to a method for manufacturing a product mainly made of paper (i.e., consisting, for the most part of the volume thereof, of paper, cardboard and/or materials derived therefrom) including at least one extremely compact radio-frequency electromagnetic wave transceiver, with a relatively short range of action and adapted both to receive at least a first predefined signal and to emit, upon receiving said first signal, at least a second signal, also predefined. Among such transceivers, which may be active or passive depending on whether or not they include a power accumulator, there are, by way of explanation, the so-called "RFID tags" and the "NFC tags".

For convenience of disclosure, in the following of the present description the term "transceiver" will refer to any transceiver of the aforesaid type (i.e., with radio-frequency electromagnetic waves, extremely compact, with a relatively short range of action and adapted both to receive at least a first predefined signal and to emit, upon receiving said first signal, at least a second signal, also predefined). These transceivers are substantially known. Therefore, no further details will be provided.

OVERVIEW OF THE PRIOR ART

Nowadays, transceivers such as RFID tags and NFC tags are applied to various objects with multiple purposes, such as, for example, anti-theft or making payments in "contactless" mode.

When a transceiver of the aforesaid type must be applied on a sheet (i.e., a small pane of an extremely reduced thickness) made of paper, such as, for example, a sheet of paper or cardboard, the application usually occurs by gluing, placing the transceiver at a face of said sheet (and therefore externally to the latter). The transceiver may therefore be visible to a person during the use of the sheet. If the purpose of using the transceiver is anti-theft, said person, seeing where the transceiver is located, may maliciously try to remove it from the sheet.

OBJECTS OF THE INVENTION

It is the object of the present invention to overcome the aforesaid drawbacks by indicating a method for manufacturing a product mainly made of paper including at least one radio-frequency electromagnetic wave transceiver of the previously mentioned type, in which said transceiver is not externally applied to the product, but inside the latter.

SUMMARY AND ADVANTAGES OF THE INVENTION

It is the object of the present invention method for manufacturing a product mainly made of paper including at least one radio-frequency electromagnetic wave transceiver adapted both to receive at least a first predefined signal and to emit, upon receiving said first signal, at least a second signal, also predefined.

The method of the invention includes the following steps:

a) providing at least a first and a second sheet, each of which:

comprising a first and a second face which are mutually opposite;

being mainly made of paper (i.e., as previously mentioned, consisting, for the most part of the volume thereof, of paper, cardboard and/or materials derived therefrom);

having a weight not less than 60 gr/m$^2$. Incidentally, "weight" of one of said sheets means the weight of the sheet if the latter (i.e., if each of the two faces of said sheet) had a surface extension of 1 m$^2$;

b) applying gluing means at said first face of said first sheet;

c) connecting, preferably by gluing, said transceiver, or each of said transceivers if more than one, to said second sheet at said first face of the latter;

d) if in step b) said gluing means have a temperature above 55° C.:

waiting for a sufficient period of time so that said gluing means cool down to such an extent that the temperature of said gluing means becomes equal to or lower than 55° C.

and/or cooling down said gluing means so that the temperature of the latter becomes equal to or lower than 55° C.;

e) if in step b) said gluing means have a temperature equal to or lower than 55° C. (and therefore step d) does not apply), within 30 seconds from when said gluing means are applied at said first face of said first sheet, opposing said sheets so that said gluing means (applied in step b) on the first face of the first sheet) come into contact, at least partially, with said first face of said second sheet and with said transceiver (applied in step c) on the first face of the second sheet) or with each of said transceivers if more than one, so as to mutually connect said sheets, by means of said gluing means, at said first faces, to said transceiver, or to each of said transceivers if more than one, interposed between said sheets, if instead in step b) said gluing means have a temperature above 55° C. (and therefore step d) applies), within 30 seconds from when the temperature of said gluing means, once applied at said first face of said first sheet, has become equal to or lower than 55° C., opposing said sheets so that said gluing means come into contact, at least partially, with said first face of said second sheet and with said transceiver or with each of said transceivers if more than one, so as to mutually connect said sheets, by means of said gluing means, at said first faces, to said transceiver, or to each of said transceivers if more than one, interposed between said sheets;

f) pressing said sheets against each other at a first pressure and for a period of time not less than 0.25 seconds, said sheets being pressed against each other so that said gluing means are tightened between:
said first face of said first sheet
and
said first face of said second sheet and said transceiver, or each of said transceivers if more than one,
if said sheets have the same weight and if the weight of each of said sheets is:
equal to or lower than 90 gr/m$^2$, said first pressure being not higher than 368 N/cm$^2$;
higher than 90 gr/m$^2$ and lower than or equal to 160 gr/m$^2$, said first pressure being not higher than 518 N/cm$^2$;
higher than 160 gr/m$^2$ and lower than or equal to 350 gr/m$^2$, said first pressure being not higher than 675 N/cm$^2$;
higher than 350 gr/m$^2$, said first pressure being not higher than 1125 N/cm$^2$,
if instead said sheets have different weights and if the weight of the sheet, between said sheets, having a lower weight is:
equal to or lower than 90 gr/m$^2$, said first pressure being not higher than 368 N/cm$^2$;
higher than 90 gr/m$^2$ and lower than or equal to 160 gr/m$^2$, said first pressure being not higher than 518 N/cm$^2$;
higher than 160 gr/m$^2$ and lower than or equal to 350 gr/m$^2$, said first pressure being not higher than 675 N/cm$^2$;
higher than 350 gr/m$^2$, said first pressure being not higher than 1125 N/cm$^2$;
g) pressing said sheets against each other at a second pressure and cutting said sheets, together with said gluing means, so as to divide said sheets, together with said gluing means, into at least a first part including said transceiver, or each of said transceivers if more than one, and a second part to be discarded,
said sheets being pressed against each other so that said gluing means are tightened between:
at least a first portion of said first face of said first sheet
and
at least a second portion of said second face of said second sheet and/or said transceiver or one or more of said transceivers if more than one,
if said gluing means are tightened, at least partially, between said first portion and said transceiver, or one or more of said transceivers if more than one, said second pressure being not higher than 6250 N/cm$^2$ per cm$^2$ of the outer surface of said transceiver tightening said gluing means, or of the overall outer surface of said transceivers tightening said gluing means,
said sheets, together with said gluing means, being cut by pressing at least one cutting tool (for example, a blade) against said second face of at least one of said sheets, so that said cutting tool passes through said sheets and said gluing means,
said first part obtained at the end of step g) corresponding to said product including said transceiver or each of said transceivers if more than one.
By implementing the method of the invention, it is possible to manufacture a product mainly made of paper including at least one transceiver of the previously mentioned type (i.e., an extremely compact radio-frequency electromagnetic wave transceiver, with a relatively short range of action and adapted both to receive at least a first predefined signal and to emit, upon receiving said first signal, at least a second signal, also predefined), in which said transceiver is not applied externally to the product, but inside the latter.

The fact that the weight of each sheet is not less than 60 gr/m$^2$ advantageously ensures that the sheets offer the transceiver interposed therebetween an adequate protection, starting from step f) of the method of the invention.

In step e), the fact that the two sheets are brought into contact with each other with the interposition of the gluing means only if the temperature of the latter is not higher than 55° C. advantageously ensures that when the transceiver comes into contact with the gluing means, it does not suffer a thermal shock such as to compromise the operation thereof.

Again in step e), the fact that the two sheets are brought into contact with each other with the interposition of the gluing means within 30 seconds from the application of the gluing means on one of the two sheets, or within 30 seconds from when the gluing means have reached a temperature of 55° C. if they have been applied at a higher temperature, advantageously ensures that the two sheets come into mutual contact when the adhesion power of the gluing means is still optimal.

In step f) the pressure ranges experimentally identified by the Applicant combined with a pressing time of at least 0.25 seconds are such that the two sheets are mutually glued with an almost zero risk that the transceiver interposed therebetween will suffer some damage.

Similarly to what has been said with regard to step f), in step g), if the two sheets are kept still with respect to the cutting tool by exerting a pressure where the transceiver is present, the limit pressure experimentally identified by the Applicant is such that the two sheets are kept sufficiently still with respect to the cutting tool with an almost zero risk that the transceiver will suffer any damage.

Other innovative features of the present invention are disclosed in the description below and referred to in the dependent claims.

According to an aspect of the invention, in step a) each of said sheets has a weight not less than 80 gr/m$^2$.

Advantageously, according to this aspect of the invention, the sheets, in addition to offering an even better protection to the transceiver interposed therebetween, avoids the risk that the transceiver is visible in transparency in the finished product. In addition thereto, if an RFID tag or an NFC tag is used as a transceiver, a weight not less than 80 gr/m$^2$ avoids the risk that the two sheets, after being glued to each other, are less flexible than the transceiver and that the latter creates a rigid area inhomogeneous with the rest of the product.

According to another aspect of the invention, in step b) said gluing means do not include polyvinyl acetate.

The polyvinyl acetate may not ensure an appropriate adherence of the transceiver to the portion of the first sheet to which it is opposed, thus facilitating, over time, an unwanted detachment of the two sheets from each other.

According to another aspect of the invention, in step b) said gluing means comprise at least one organic adhesive including animal gelatin.

The organic adhesives based on animal gelatin advantageously ensure a high adhesion between the transceiver and the portion of the first sheet to which it is opposed.

According to another aspect of the invention, in step f), if said sheets have the same weight and if the weight of each of said sheets is:

- equal to or lower than 90 gr/m², said first pressure is not higher than 245 N/cm²;
- higher than 90 gr/m² and lower than or equal to 160 gr/m², said first pressure is not higher than 345 N/cm²;
- higher than 160 gr/m² and lower than or equal to 350 gr/m², said first pressure is not higher than 450 N/cm²;
- higher than 350 gr/m², said first pressure is not higher than 750 N/cm², if instead said sheets have different weights and if the weight of the sheet, between said sheets, having a lower weight is:

- equal to or lower than 90 gr/m², said first pressure being not higher than 245 N/cm²;
- higher than 90 gr/m² and lower than or equal to 160 gr/m², said first pressure being not higher than 345 N/cm²;
- higher than 160 gr/m² and lower than or equal to 350 gr/m², said first pressure being not higher than 450 N/cm²;
- higher than 350 gr/m², said first pressure being not higher than 750 N/cm².

In the light of the tests carried out by the Applicant, the pressure ranges according to this aspect of the invention advantageously ensure a mutual gluing of the two sheets with an even lower risk that the transceiver interposed therebetween will suffer some damage.

According to another aspect of the invention, in step g), if said gluing means are tightened, at least partially, between said first portion and said transceiver, or one or more of said transceivers if more than one, said second pressure is not higher than 3125 N/cm² per cm² of the outer surface of said transceiver tightening said gluing means, or of the overall outer surface of said transceivers tightening said gluing means, if more than one.

In the light of tests carried out by the Applicant, the pressure limit according to this aspect of the invention advantageously ensures that the two sheets are kept sufficiently still with respect to the cutting tool with an even lower risk that the transceiver will suffer some damage.

According to another aspect of the invention, in step a), a first plurality of said first sheets and a second plurality of said second sheets are provided,

- in step a) multiple pairs of sheets being also provided, each of which including a sheet of said first plurality and a sheet of said second plurality,
- steps b) to f) being carried out for each of said pairs of sheets,
- in step g) said pairs of sheets being stacked and pressed simultaneously against each other at said second pressure so that:
  - in each of said pairs of sheets, said sheets are pressed against each other
  and
  - said first portions of said first faces of said first sheets of said pairs are mutually superimposed,
- in step g), if in one or more of said pairs of sheets, said gluing means are tightened, at least partially, between said first portion and said transceiver, or one or more of said transceivers if more than one, "outer tightening surface" of one of said pairs of sheets where said gluing means are tightened, at least partially, between said first portion and said transceiver, or one or more of said transceivers if more than one, is defined as the outer surface of said transceiver interposed between said sheets of said pair of sheets and tightening (said transceiver) said gluing means, or as the overall outer surface of said transceivers interposed between said sheets of said pair of sheets and tightening (said transceivers) said gluing means, if more than one,
- in step g), if in only one of said pairs of sheets, said gluing means are tightened, at least partially, between said first portion and said transceiver, or one or more of said transceivers if more than one, said second pressure being not higher than 6250 N/cm² per cm² of the outer tightening surface of said pair of sheets where said gluing means are tightened, at least partially, between said first portion and said transceiver or said transceivers,
- in step g), if in more than one of said pairs of sheets, said gluing means are tightened, at least partially, between said first portion and said transceiver, or one or more of said transceivers if more than one, said second pressure being not higher than 6250 N/cm² per cm² of said outer tightening surface being the least extended of said outer tightening surfaces, respectively, of said pairs of sheets where said gluing means are tightened, at least partially, between said first portion and said transceiver or said transceivers,
- in step g) said cutting tool passing through said sheets, together with said gluing means, of each of said pairs of sheets so that in each of said pairs of sheets, said sheets, together with said gluing means, are cut so as to be divided, together with said gluing means, into at least said first and second parts.

Incidentally, a pair of sheets has an outer tightening surface if and only if, in step g), said gluing means interposed between said sheets of said pair of sheets are tightened, at least partially, between said first portion and said transceiver or one or more of said transceivers if more than one.

Advantageously, according to this aspect of the invention, a single cutting operation may be carried out to cut multiple pairs of sheets so as to obtain multiple products.

According to another aspect of the invention, in step g), said pairs of sheets are stacked so that said transceivers, interposed between said sheets of two of said pairs of sheets adjacent to each other, respectively, are not mutually superimposed.

Advantageously, according to this aspect of the invention, being the pairs of sheets stacked so that the transceivers are offset, the risk of the latter being damaged during the pressing performed in step g) is even lower.

According to another aspect of the invention, if, in step g):

- said pairs of sheets which are stacked are in a number between eleven and twenty-five
and
- in only one of said pairs of sheets, said gluing means are tightened, at least partially, between said first portion and said transceiver or one or more of said transceivers if more than one,
- said second pressure is not higher than 3750 N/cm² per cm² of the outer tightening surface of said pair of sheets where said gluing means are tightened, at least partially, between said first portion and said transceiver or said transceivers, if instead, in step g):
said pairs of sheets which are stacked are in a number between eleven and twenty-five
and
in more than one of said pairs of sheets, said gluing means are tightened, at least partially, between said first portion and said transceiver or one or more of said transceivers if more than one,
said second pressure is not higher than 3750 N/cm$^2$ per cm$^2$ of said outer tightening surface being the least extended of said outer tightening surfaces, respectively, of said pairs of sheets where said gluing means are tightened, at least partially, between said first portion and said transceiver or said transceivers.

In the light of tests carried out by the Applicant, the pressure limit according to this aspect of the invention advantageously ensures that the sheets are kept sufficiently still with respect to the cutting tool with an even lower risk that the transceivers will suffer damages.

According to another aspect of the invention, if, in step g):
said pairs of sheets which are stacked are more than twenty-five in number
and
in only one of said pairs of sheets, said gluing means are tightened, at least partially, between said first portion and said transceiver or one or more of said transceivers,
said second pressure is not higher than 1250 N/cm$^2$ per cm$^2$ of the outer tightening surface of said pair of sheets where said gluing means are tightened, at least partially, between said first portion and said transceiver or said transceivers,
if instead, in step g):
said pairs of sheets which are stacked are more than twenty-five in number
and
in more than one of said pairs of sheets, said gluing means are tightened, at least partially, between said first portion and said transceiver, said second pressure is not higher than 1250 N/cm$^2$ per cm$^2$ of said outer tightening surface being the least extended of said outer tightening surfaces, respectively, of said pairs of sheets where said gluing means are tightened, at least partially, between said first portion and said transceiver or said transceivers.

In the light of tests carried out by the Applicant, the pressure limit according to this aspect of the invention advantageously ensures that the sheets are kept sufficiently still with respect to the cutting tool with an even lower risk that the transceivers will suffer damages.

DETAILED DESCRIPTION OF SOME PREFERRED EMBODIMENTS OF THE INVENTION

It is the object of the present invention method for manufacturing a product mainly made of paper including at least one radio-frequency electromagnetic wave transceiver adapted both to receive at least a first predefined signal and to emit, upon receiving said first signal, at least a second signal, also predefined.

Said transceiver is preferably an RFID tag or an NFC tag.

The first step of the method object of the invention consists in providing at least a first and a second sheet each of which comprising a first and a second face, mutually opposite. Each of said sheets is mainly made of paper and preferably, but not necessarily, consists of a sheet of paper or cardboard. Each sheet has a weight not less than 60 g/m$^2$ and preferably not less than 80 g/m$^2$.

The sheets are preferably cut to size and on one of them, by way of explanation the first, gluing means are applied at the first face. Preferably, the gluing means do not comprise polyvinyl acetate. Conversely, the gluing means preferably comprise at least one organic adhesive including animal gelatin. For convenience of disclosure, the gluing means will be indicated in the following of the present description with the expression "glue". If the sheets have a different size, the glue is preferably applied to the sheet having the smallest surface extension. If the sheets have the same size but a different weight, the glue is preferably applied to the sheet having the higher weight.

The glue is preferably applied by means of two or more mutually opposed rollers. More precisely, the sheet intended to receive the glue is preferably made to translate between at least two rollers placed one above the other. The lower roller is adapted to drag the sheet and is refractory to glue. The upper roller applies the glue on the sheet and has a temperature preferably between 55° C. and 68° C. The application of an adhesive substance on a sheet of paper by means of mutually opposed rollers is a substantially known operation. Therefore, no further details will be provided.

The transceiver intended to be included in a product mainly made of paper (resulting from the implementation of the method object of the invention) is applied on the first face of the second sheet (i.e., on the sheet where the glue is not spread). The transceiver is generally presented as a label provided with an adhesive at one of the faces thereof. The application (i.e., the connection) of the transceiver to the first face of the second sheet therefore preferably occurs by gluing.

After having applied the glue on the first face of the first sheet and having connected the transceiver to the first face of the second sheet, it is necessary to couple the two sheets. More precisely, the sheets are opposed so that the glue present on the first face of the first sheet comes into contact, at least partially, with the first face of the second sheet and with the transceiver (connected to the second sheet at the first face of the latter), so as to mutually connect the two sheets, by means of the glue, at the respective first faces thereof and with the transceiver interposed between the latter.

In order not to damage the transceiver, it is necessary that the glue is at a temperature not higher than 55° C. when it comes into contact with the transceiver.

Thereby, if the glue, when it is applied at the first face of the first sheet, has a temperature higher than 55° C., before coupling the sheets to each other (and therefore before the glue comes into contact with the transceiver), it is necessary to wait a sufficient period of time for the glue to cool so that the temperature of the glue becomes equal to or lower than 55° C. and/or to cool the glue so that the temperature of the glue becomes equal to or lower than 55° C.

Given the above, it is advisable to couple the two sheets within a short time upon applying the glue on the first face of the first sheet. If the glue, when it is applied at the first face of the first sheet, has a temperature equal to or lower than 55° C., the coupling of the two sheets is preferably carried out within 30 seconds from the application of the glue on the first face of the first sheet. On the other hand, if the glue, when it is applied at the first face of the first sheet, has a temperature higher than 55° C., the coupling of the two sheets is preferably carried out within 30 seconds from when the temperature of the glue, after having been applied at the first face of the first sheet, has become equal to or lower than 55° C.

After the two sheets have been coupled, it is necessary to press the sheets against each other so as to ensure the grip of the glue. More precisely, the sheets are pressed against each other, preferably by calendering, for a period of time not less than 0.25 seconds and so that the glue is tightened between, on one side, the first face of the first sheet and, on the other side, the first face of the second sheet and the transceiver.

The pressure at which the sheets are pressed against each other must be such so as not to damage the transceiver. Thereby, if the sheets have the same weight and if the weight of each sheet is:
- equal to or lower than 90 gr/m$^2$, the pressure at which the sheets are pressed against each other is not higher than 368 N/cm$^2$ and preferably not higher than 245 N/cm$^2$;
- higher than 90 gr/m$^2$ and lower or equal to 160 gr/m$^2$, the pressure at which the sheets are pressed against each other is not higher than 518 N/cm$^2$ and preferably not higher than 345 N/cm$^2$;
- higher than 160 gr/m$^2$ and lower or equal to 350 gr/m$^2$, the pressure at which the sheets are pressed against each other is not higher than 675 N/cm$^2$ and preferably not higher than 450 N/cm$^2$;
- higher than 350 gr/m$^2$, the pressure at which the sheets are pressed against each other is not higher than 1125 N/cm$^2$ and preferably not higher than 750 N/cm$^2$.

If instead the sheets have different weights, again so as not to damage the transceiver, if the weight of the sheet, between said sheets, having a lower weight is:
- equal to or lower than 90 gr/m$^2$, the pressure at which the sheets are pressed against each other is not higher than 368 N/cm$^2$ and preferably not higher than 245 N/cm$^2$;
- higher than 90 gr/m$^2$ and lower or equal to 160 gr/m$^2$, the pressure at which the sheets are pressed against each other is not higher than 518 N/cm$^2$ and preferably not higher than 345 N/cm$^2$;
- higher than 160 gr/m$^2$ and lower or equal to 350 gr/m$^2$, the pressure at which the sheets are pressed against each other is not higher than 675 N/cm$^2$ and preferably not higher than 450 N/cm$^2$;
- higher than 350 gr/m$^2$, the pressure at which the sheets are pressed against each other is not higher than 1125 N/cm$^2$ and preferably not higher than 750 N/cm$^2$.

Once the calendering of the sheets is completed, the latter are subjected to a finishing cut. To carry out this operation the sheets are again pressed against each other and cut, together with the glue interposed therebetween, so as to divide the sheets, together with the glue, into at least a first part including the transceiver, and a second part intended to be discarded. The sheets, together with the glue, are cut by pressing at least one cutting tool (for example, a blade) against the second face of at least one of the sheets, so that the cutting tool passes through the sheets and the glue.

During the finishing cut, the sheets are pressed against each other so as to keep them still with respect to the cutting tool. The sheets are pressed against each other so that the glue is tightened between, on one side, at least a first portion of the first face of the first sheet and, on the other side, at least a second portion of the first face of the second sheet and/or the transceiver. Similarly to what has been mentioned with regard to the calibration, the pressure at which the sheets are pressed against each other during the finishing cut must be such as not to damage the transceiver. If the latter is not in the coupling area of the two sheets where the pressure is applied, the latter may take on any value.

Conversely, if the glue is tightened, at least partially, between the aforesaid first portion of the first face of the first sheet and the transceiver, the pressure at which the sheets are pressed against each other is not higher than 6250 N/cm$^2$ per cm$^2$ of outer surface of the transceiver, and is preferably not higher than 3125 N/cm$^2$ per cm$^2$ of outer surface of the transceiver.

The aforesaid first part obtained at the end of the finishing cut corresponds to the product, including at least one transceiver, which is obtained by implementing the method of the invention. In light of the foregoing, by implementing the method object of the invention, it is possible to manufacture a product mainly made of paper including at least one extremely compact radio-frequency electromagnetic wave transceiver, with a relatively short range of action and adapted both to receive at least a first predefined signal and to emit, upon receiving said first signal, at least a second signal, also predefined), in which said transceiver is not applied externally to the product, but inside the latter.

The "programming" of the transceiver (i.e., the storing of information on said transceiver so that the latter emits an appropriate signal following the reception of another suitable signal) may be carried out in any step of the method of the invention. If multiple products are manufactured by implementing the method of the invention, the programming of the transceivers respectively included in said products may be, by way of explanation, "anonymous" or "nominal". If the programming is "anonymous", the information respectively stored in the transceivers are identical for all the products or different but with random encodings. If, instead, the programming is "nominal", the information respectively stored in the transceivers are uniquely combined with the product including the transceiver where the information is stored.

In order to better understand what is meant by "anonymous programming" and "nominal programming", an example of the use of products obtainable by implementing the method object of the invention will be described below.

The aforesaid products may consist, by way of explanation, in brochures distributed by a company. Following the approaching to the transceiver included in a brochure of a smartphone capable of interacting with said transceiver (for example, as it is sensitive to RFID tags or NFC tags), the transceiver may "command" said smartphone to connect to a company server. This would advantageously allow to keep track of whether a person has "interacted" with a brochure.

Furthermore, following a connection with the server by a smartphone, the server may transmit to the smartphone which has established the connection computer content, advantageously modifiable over time by the company.

If the programming of the transceivers included in the brochures is anonymous, the company may only keep track of the fact that a person has interacted with one of the aforesaid brochures. On the other hand, if the programming of the transceivers is nominal, the company may keep track of whether a person has interacted with a particular brochure or not. In this second case, the computer content which may be sent in response to a connection with the server by a smartphone may be customized for each brochure.

The method of the invention allows to include multiple transceivers in the same product. In such case, what has been described applies to each of the transceivers.

More precisely, each transceiver must be applied on the first face of the second sheet. The sheets must also be opposed so that the glue present on the first face of the first sheet comes into contact, at least partially, with the first face of the second sheet and with each of the transceivers (connected to the second sheet at the first face of the latter), so as to mutually connect the two sheets, by means of the glue, at the respective first faces thereof and with the transceivers interposed between the latter. Finally, with regard to the finishing cut, if the sheets are pressed against each other so that the glue is tightened, at least partially, between the first portion of the first face of the first sheet and one or more transceivers, the pressure at which the sheets are pressed against each other is not higher than 6250 N/cm$^2$ per cm$^2$ of the total outer surface of the glue-tightening transceivers, and is preferably not higher than 3125 N/cm$^2$ for cm$^2$ of the total outer surface of the glue-tightening transceivers.

The method of the invention further allows to include multiple sheets in the same product. In such case, what has been described is still valid since the first and/or the second sheet may correspond to a plurality of sheets mutually connected by gluing.

If the method of the invention is implemented to manufacture a plurality of products each including one or more transceivers, a single finishing cut operation may be carried out to divide each of multiple pairs of sheets into the first and second parts mentioned above.

In such case, it is necessary that a first plurality of first sheets and a second plurality of second sheets are provided. Multiple pairs of sheets shall therefore be provided, each of which including a sheet of the first plurality and a sheet of the second plurality. The method of the invention is implemented for each pair of sheets until the end of the calendering. To carry out the finishing cut, the pairs of sheets are simultaneously stacked and pressed against each other so that in each pair of sheets, the sheets are pressed against each other, and the first portions previously mentioned of the first faces of the first sheets of said pairs of sheets are mutually superimposed. To carry out the cut, the cutting tool passes through the sheets, and the glue interposed therebetween, of each pair of sheets so that in each of said pairs, the sheets, together with the glue, are cut so as to be divided into at least the aforesaid first and second parts.

The pairs of sheets are preferably stacked so that the transceivers, interposed between the sheets of two pairs of sheets adjacent to each other, respectively, are not mutually superimposed.

If, in the finishing cut, in a single pair of sheets the glue is tightened, at least partially, between the aforesaid first portion of the first face of the first sheet of said pair and the transceiver, or one or more transceivers if more than one, the pressure at which the pairs of sheets are pressed against each other is preferably not higher than 6250 N/cm$^2$ per cm$^2$ of outer tightening surface of said pair of sheets where the glue is tightened, at least partially, between the aforesaid first portion of the first face of the first sheet of said pair and one or more transceivers.

If instead, in the finishing cut, in more than one pair of sheets the glue is tightened, at least partially, between the aforesaid first portion of the first face of the first sheet and the transceiver, or one or more transceivers if more than one, the pressure at which the pairs of sheets are pressed against each other is preferably not higher than 6250 N/cm$^2$ per cm$^2$ of said outer clamping surface being the least extended of said outer clamping surfaces, respectively, of said pairs of sheets where the glue is tightened, at least partially, between the aforesaid first portion of the first face of the first sheet and one or more transceivers.

More preferably, if the pairs of sheets which are stacked one on top of the other are in a number between eleven and twenty-five and, in the finishing cut, in a single pair of sheets the glue is tightened, at least partially, between the aforesaid first portion of the first face of the first sheet of said pair and the transceiver, or one or more transceivers if more than one, the pressure at which the pairs of sheets are pressed against each other is not higher than 3750 N/cm$^2$ per cm$^2$ of outer tightening surface of said pair of sheets where the glue is tightened, at least partially, between the aforesaid first portion of the first face of the first sheet of said pair and one or more transceiver.

If the pairs of sheets which are stacked one on top of the other are in a number between eleven and twenty-five but, in the finishing cut, in more than one pair of sheets the glue is tightened, at least partially, between the aforesaid first portion of the first face of the first sheet and the transceiver, or one or more transceivers if more than one, the pressure at which the pairs of sheets are pressed against each other is preferably not higher than 3750 N/cm$^2$ per cm$^2$ of said outer clamping surface being the least extended of said outer clamping surfaces, respectively, of said pairs of sheets where the glue is tightened, at least partially, between the aforesaid first portion of the first face of the first sheet and one or more transceivers.

If the pairs of sheets which are stacked one on top of the other are in a number higher than twenty-five and, in the finishing cut, in a single pair of sheets the glue is tightened, at least partially, between the aforesaid first portion of the first face of the first sheet of said pair and the transceiver, or one or more transceivers if more than one, the pressure at which the pairs of sheets are pressed against each other is preferably not higher than 1250 N/cm$^2$ per cm$^2$ of outer tightening surface of said pair of sheets where the glue is tightened, at least partially, between the aforesaid first portion of the first face of the first sheet of said pair and one or more transceivers.

If the pairs of sheets which are stacked one on top of the other are in a number higher than twenty-five but, in the finishing cut, in more than one pair of sheets the glue is tightened, at least partially, between the aforesaid first portion of the first face of the first sheet and the transceiver, or one or more transceivers if more than one, the pressure at which the pairs of sheets are pressed against each other is preferably not higher than 1250 N/cm$^2$ per cm$^2$ of said outer clamping surface being the least extended of said outer clamping surfaces, respectively, of said pairs of sheets where the glue is tightened, at least partially, between the aforesaid first portion of the first face of the first sheet and one or more transceivers.

Based on the provided description of a preferred embodiment, it is apparent that changes may be introduced by a person skilled in the art without because of this departing from the scope of protection of the invention as defined by the following claims.

The invention claimed is:

1. A method for manufacturing a product mainly made of paper including at least one radio-frequency electromagnetic wave transceiver adapted both to receive at least a first predefined signal and to emit, upon receiving said first signal, at least a second signal, also predefined, said method comprising:
a) providing at least a first and a second sheet, each of which:
comprising a first and a second face which are mutually opposite;

being mainly made of paper;
having a weight not less than 60 gr/m²;
b) applying gluing means at said first face of said first sheet;
c) connecting said transceiver, or each of said transceivers if more than one, to the first face of said second sheet;
d) if in step b) said gluing means have a temperature above 55° C.:
waiting for a sufficient period of time so that said gluing means cool down to such an extent that the temperature of said gluing means becomes equal to or lower than 55° C. and/or
cooling down said gluing to a temperature equal to or lower than 55° C.;
e) if in step b) said gluing means have a temperature equal to or lower than 55° C., within 30 seconds from when said gluing means are applied at said first face of said first sheet, opposing said sheets so that said gluing means come into contact, at least partially, with said first face of said second sheet and with said transceiver or with each of said transceivers if more than one, so as to mutually connect said sheets, by means of said gluing means, at said first faces, to said transceiver, or to each of said transceivers if more than one, interposed between said sheets, if instead in step b) said gluing means have a temperature above 55° C., within 30 seconds from when the temperature of said gluing means, once applied at said first face of said first sheet, becomes equal to or lower than 55° C., opposing said sheets so that said gluing means come into contact, at least partially, with said first face of said second sheet and with said transceiver or with each of said transceivers if more than one,
so as to mutually connect said sheets, by means of said gluing means, at said first faces, to said transceiver, or to each of said transceivers if more than one, interposed between said sheets;
f) pressing said sheets against each other at a first pressure and for a period of time not less than 0.25 seconds,
said sheets being pressed against each other so that said gluing means are tightened between:
said first face of said first sheet
and
said first face of said second sheet and said transceiver, or each of said transceivers if more than one,
if said sheets have the same weight and if the weight of each of said sheets is:
equal to or lower than 90 gr/m², said first pressure being not higher than 368 N/cm²;
higher than 90 gr/m² and lower than or equal to 160 gr/m², said first pressure being not higher than 518 N/cm²;
higher than 160 gr/m² and lower than or equal to 350 gr/m², said first pressure being not higher than 675 N/cm²;
higher than 350 gr/m², said first pressure being not higher than 1125 N/cm²,
if instead said sheets have different weights and if the weight of the sheet, between said sheets, having a lower weight is:
equal to or lower than 90 gr/m², said first pressure being not higher than 368 N/cm²;
higher than 90 gr/m² and lower than or equal to 160 gr/m², said first pressure being not higher than 518 N/cm²;
higher than 160 gr/m² and lower than or equal to 350 gr/m², said first pressure being not higher than 675 N/cm²;
higher than 350 gr/m², said first pressure being not higher than 1125 N/cm²;
g) pressing said sheets against each other at a second pressure and cutting said sheets, together with said gluing means, so as to divide said sheets, together with said gluing means, into at least a first part including said transceiver, or each of said transceivers if more than one, and a second part to be discarded,
said sheets being pressed against each other so that said gluing means are tightened between:
at least a first portion of said first face of said first sheet and
at least a second portion of said second face of said second sheet and/or said transceiver or one or more of said transceivers if more than one,
if said gluing means are tightened, at least partially, between said first portion and said transceiver, or one or more of said transceivers if more than one, said second pressure being not higher than 6250 N/cm² per cm² of the outer surface of said transceiver tightening said gluing means, or of the overall outer surface of said transceivers tightening said gluing means, said sheets, together with said gluing means, being cut by pressing at least one cutting tool against said second face of at least one of said sheets, so that said cutting tool passes through said sheets and said gluing means,
said first part obtained at the end of step g) corresponding to said product including said transceiver or each of said transceivers if more than one.

2. The method according to claim 1, wherein, in step a), each of said sheets has a weight not less than 80 gr/m².

3. The method according to claim 1, wherein, in step b), said gluing means do not comprise polyvinyl acetate.

4. The method according to claim 1, wherein, in step b), said gluing means comprise at least one organic adhesive including animal gelatin.

5. The method according to claim 1, wherein, in step f), if said sheets have the same weight and if the weight of each of said sheets is:
equal to or lower than 90 gr/m², said first pressure is not higher than 245 N/cm²;
higher than 90 gr/m² and lower than or equal to 160 gr/m², said first pressure is not higher than 345 N/cm²;
higher than 160 gr/m² and lower than or equal to 350 gr/m², said first pressure is not higher than 450 N/cm²;
higher than 350 gr/m², said first pressure is not higher than 750 N/cm²,
if instead said sheets have different weights and if the weight of the sheet, between said sheets, having a lower weight is:
equal to or lower than 90 gr/m², said first pressure being not higher than 245 N/cm²;
higher than 90 gr/m² and lower than or equal to 160 gr/m², said first pressure being not higher than 345 N/cm²;
higher than 160 gr/m² and lower than or equal to 350 gr/m², said first pressure being not higher than 450 N/cm²;
higher than 350 gr/m², said first pressure being not higher than 750 N/cm².

6. The method according to claim 1, wherein, in step g), if said gluing means are tightened, at least partially, between said first portion and said transceiver, or one or more of said transceivers if more than one, said second pressure is not higher than 3125 N/cm$^2$ per cm$^2$ of the outer surface of said transceiver tightening said gluing means, or of the overall outer surface of said transceivers tightening said gluing means.

7. The method according to claim 1, wherein, in step a), a first plurality of said first sheets and a second plurality of said second sheets are provided,
  in step a) multiple pairs of sheets being also provided, each of which including a sheet of said first plurality and a sheet of said second plurality,
  steps b) to f) being carried out for each of said pairs of sheets,
  in step g) said pairs of sheets being stacked and pressed simultaneously against each other at said second pressure so that:
  in each of said pairs of sheets, said sheets are pressed against each other
  and
  said first portions of said first faces of said first sheets of said pairs are mutually superimposed,
  in step g), if in one or more of said pairs of sheets, said gluing means are tightened, at least partially, between said first portion and said transceiver, or one or more of said transceivers if more than one, "outer tightening surface" of one of said pairs of sheets where said gluing means are tightened, at least partially, between said first portion and said transceiver, or one or more of said transceivers if more than one, means the outer surface of said transceiver interposed between said sheets of said pair of sheets and tightening said gluing means, or the overall outer surface of said transceivers interposed between said sheets of said pair of sheets and tightening said gluing means, if more than one,
  in step g), if in only one of said pairs of sheets, said gluing means are tightened, at least partially, between said first portion and said transceiver, or one or more of said transceivers if more than one, said second pressure being not higher than 6250 N/cm$^2$ per cm$^2$ of the outer tightening surface of said pair of sheets where said gluing means are tightened, at least partially, between said first portion and said transceiver or said transceivers,
  in step g), if in more than one of said pairs of sheets, said gluing means are tightened, at least partially, between said first portion and said transceiver, or one or more of said transceivers if more than one, said second pressure being not higher than 6250 N/cm$^2$ per cm$^2$ of said outer tightening surface being the least extended of said outer tightening surfaces, respectively, of said pairs of sheets where said gluing means are tightened, at least partially, between said first portion and said transceiver or said transceivers,
  in step g) said cutting tool passing through said sheets, together with said gluing means, of each of said pairs of sheets so that in each of said pairs of sheets, said sheets, together with said gluing means, are cut so as to be divided, together with said gluing means, into at least said first and second parts.

8. The method according to claim 7, wherein, in step g), said pairs of sheets are stacked so that said transceivers, interposed between said sheets of two of said pairs of sheets adjacent to each other, respectively, are not mutually superimposed.

9. The method according to claim 7, wherein if, in step g):
  said pairs of sheets which are stacked are in a number between eleven and twenty-five and
  in only one of said pairs of sheets, said gluing means are tightened, at least partially, between said first portion and said transceiver, or one or more of said transceivers if more than one,
  said second pressure is not higher than 3750 N/cm$^2$ per cm$^2$ of the outer tightening surface of said pair of sheets where said gluing means are tightened, at least partially, between said first portion and said transceiver or said transceivers,
  if instead, in step g):
  said pairs of sheets which are stacked are in a number between eleven and twenty-five and
  in more than one of said pairs of sheets, said gluing means are tightened, at least partially, between said first portion and said transceiver, or one or more of said transceivers if more than one,
  said second pressure being not higher than 3750 N/cm$^2$ per cm$^2$ of said outer tightening surface being the least extended of said outer tightening surfaces, respectively, of said pairs of sheets where said gluing means are tightened, at least partially, between said first portion and said transceiver or said transceivers.

10. The method according to claim 7, wherein if, in step g):
  said pairs of sheets which are stacked are more than twenty-five in number and
  in only one of said pairs of sheets, said gluing means are tightened, at least partially, between said first portion and said transceiver or one or more of said transceivers,
  said second pressure is not higher than 1250 N/cm$^2$ per cm$^2$ of the outer tightening surface of said pair of sheets where said gluing means are tightened, at least partially, between said first portion and said transceiver or said transceivers,
  if instead, in step g):
  said pairs of sheets which are stacked are more than twenty-five in number
  and
  in more than one of said pairs of sheets, said gluing means are tightened, at least partially, between said first portion and said transceiver,
  said second pressure being not higher than 1250 N/cm$^2$ per cm$^2$ of said outer tightening surface being the least extended of said outer tightening surfaces, respectively, of said pairs of sheets where said gluing means are tightened, at least partially, between said first portion and said transceiver or said transceivers.

11. The method according to claim 2, wherein, in step b), said gluing means do not comprise polyvinyl acetate.

12. The method according to claim 11, wherein, in step b), said gluing means comprise at least one organic adhesive including animal gelatin.

13. The method according to claim 11, wherein, in step f), if said sheets have the same weight and if the weight of each of said sheets is:
  equal to or lower than 90 gr/m$^2$, said first pressure is not higher than 245 N/cm$^2$;
  higher than 90 gr/m$^2$ and lower than or equal to 160 gr/m$^2$, said first pressure is not higher than 345 N/cm$^2$;
  higher than 160 gr/m$^2$ and lower than or equal to 350 gr/m$^2$, said first pressure is not higher than 450 N/cm$^2$;
  higher than 350 gr/m$^2$, said first pressure is not higher than 750 N/cm$^2$,
  if instead said sheets have different weights and if the weight of the sheet, between said sheets, having a lower weight is:

equal to or lower than 90 gr/m², said first pressure being not higher than 245 N/cm²;

higher than 90 gr/m² and lower than or equal to 160 gr/m², said first pressure being not higher than 345 N/cm²;

higher than 160 gr/m² and lower than or equal to 350 gr/m², said first pressure being not higher than 450 N/cm²;

higher than 350 gr/m², said first pressure being not higher than 750 N/cm².

14. The method according to claim 12, wherein, in step f), if said sheets have the same weight and if the weight of each of said sheets is:

equal to or lower than 90 gr/m², said first pressure is not higher than 245 N/cm²;

higher than 90 gr/m² and lower than or equal to 160 gr/m², said first pressure is not higher than 345 N/cm²;

higher than 160 gr/m² and lower than or equal to 350 gr/m², said first pressure is not higher than 450 N/cm²;

higher than 350 gr/m², said first pressure is not higher than 750 N/cm², if instead said sheets have different weights and if the weight of the sheet, between said sheets, having a lower weight is:

equal to or lower than 90 gr/m², said first pressure being not higher than 245 N/cm²;

higher than 90 gr/m² and lower than or equal to 160 gr/m², said first pressure being not higher than 345 N/cm²;

higher than 160 gr/m² and lower than or equal to 350 gr/m², said first pressure being not higher than 450 N/cm²;

higher than 350 gr/m², said first pressure being not higher than 750 N/cm².

15. The method according to claim 11, wherein, in step g), if said gluing means are tightened, at least partially, between said first portion and said transceiver, or one or more of said transceivers if more than one, said second pressure is not higher than 3125 N/cm² per cm² of the outer surface of said transceiver tightening said gluing means, or of the overall outer surface of said transceivers tightening said gluing means.

16. The method according to claim 12, wherein, in step g), if said gluing means are tightened, at least partially, between said first portion and said transceiver, or one or more of said transceivers if more than one, said second pressure is not higher than 3125 N/cm² per cm² of the outer surface of said transceiver tightening said gluing means, or of the overall outer surface of said transceivers tightening said gluing means.

17. The method according to claim 13, wherein, in step g), if said gluing means are tightened, at least partially, between said first portion and said transceiver, or one or more of said transceivers if more than one, said second pressure is not higher than 3125 N/cm² per cm² of the outer surface of said transceiver tightening said gluing means, or of the overall outer surface of said transceivers tightening said gluing means.

18. The method according to claim 14, wherein, in step g), if said gluing means are tightened, at least partially, between said first portion and said transceiver, or one or more of said transceivers if more than one, said second pressure is not higher than 3125 N/cm² per cm² of the outer surface of said transceiver tightening said gluing means, or of the overall outer surface of said transceivers tightening said gluing means.

19. The method according to claim 17, wherein, in step a), a first plurality of said first sheets and a second plurality of said second sheets are provided, in step a) multiple pairs of sheets being also provided, each of which including a sheet of said first plurality and a sheet of said second plurality, steps b) to f) being carried out for each of said pairs of sheets, in step g) said pairs of sheets being stacked and pressed simultaneously against each other at said second pressure so that:

in each of said pairs of sheets, said sheets are pressed against each other and said first portions of said first faces of said first sheets of said pairs are mutually superimposed, in step g), if in one or more of said pairs of sheets, said gluing means are tightened, at least partially, between said first portion and said transceiver, or one or more of said transceivers if more than one, "outer tightening surface" of one of said pairs of sheets where said gluing means are tightened, at least partially, between said first portion and said transceiver, or one or more of said transceivers if more than one, means the outer surface of said transceiver interposed between said sheets of said pair of sheets and tightening said gluing means, or the overall outer surface of said transceivers interposed between said sheets of said pair of sheets and tightening said gluing means, if more than one, in step g), if in only one of said pairs of sheets, said gluing means are tightened, at least partially, between said first portion and said transceiver, or one or more of said transceivers if more than one, said second pressure being not higher than 6250 N/cm² per cm² of the outer tightening surface of said pair of sheets where said gluing means are tightened, at least partially, between said first portion and said transceiver or said transceivers, in step g), if in more than one of said pairs of sheets, said gluing means are tightened, at least partially, between said first portion and said transceiver, or one or more of said transceivers if more than one, said second pressure being not higher than 6250 N/cm² per cm² of said outer tightening surface being the least extended of said outer tightening surfaces, respectively, of said pairs of sheets where said gluing means are tightened, at least partially, between said first portion and said transceiver or said transceivers, in step g) said cutting tool passing through said sheets, together with said gluing means, of each of said pairs of sheets so that in each of said pairs of sheets, said sheets, together with said gluing means, are cut so as to be divided, together with said gluing means, into at least said first and second parts.

20. The method according to claim 18, wherein, in step a), a first plurality of said first sheets and a second plurality of said second sheets are provided, in step a) multiple pairs of sheets being also provided, each of which including a sheet of said first plurality and a sheet of said second plurality, steps b) to f) being carried out for each of said pairs of sheets, in step g) said pairs of sheets being stacked and pressed simultaneously against each other at said second pressure so that:

in each of said pairs of sheets, said sheets are pressed against each other and said first portions of said first faces of said first sheets of said pairs are mutually superimposed, in step g), if in one or more of said pairs of sheets, said gluing means are tightened, at least partially, between said first portion and said transceiver, or one or more of said transceivers if more than one, "outer tightening surface" of one of said pairs of sheets where said gluing means are tightened, at least partially, between said first portion and said transceiver, or one or more of said transceivers if more than one, means the outer surface of said transceiver interposed between said sheets of said pair of sheets and tightening said gluing means, or the overall outer surface of said transceivers interposed between said sheets of said pair of sheets and tightening said gluing means, if more than one, in step g), if in only one of said pairs of sheets, said gluing means are tightened, at least partially, between said first portion and said transceiver, or one or more of said transceivers if more than one, said second pressure being not higher than 6250 N/cm$^2$ per cm$^2$ of the outer tightening surface of said pair of sheets where said gluing means are tightened, at least partially, between said first portion and said transceiver or said transceivers, in step g), if in more than one of said pairs of sheets, said gluing means are tightened, at least partially, between said first portion and said transceiver, or one or more of said transceivers if more than one, said second pressure being not higher than 6250 N/cm$^2$ per cm of said outer tightening surface being the least extended of said outer tightening surfaces, respectively, of said pairs of sheets where said gluing means are tightened, at least partially, between said first portion and said transceiver or said transceivers, in step g) said cutting tool passing through said sheets, together with said gluing means, of each of said pairs of sheets so that in each of said pairs of sheets, said sheets, together with said gluing means, are cut so as to be divided, together with said gluing means, into at least said first and second parts.

* * * * *